(12) United States Patent
Liu et al.

(10) Patent No.: US 8,239,332 B2
(45) Date of Patent: Aug. 7, 2012

(54) CONSTRAINED LINE SEARCH OPTIMIZATION FOR DISCRIMINATIVE TRAINING OF HMMS

(75) Inventors: Peng Liu, Beijing (CN); Hui Jiang, Beijing (CN); Frank Kao-PingK Soong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1205 days.

(21) Appl. No.: 11/943,210

(22) Filed: Nov. 20, 2007

(65) Prior Publication Data

US 2009/0132444 A1   May 21, 2009

(51) Int. Cl.
*G06F 15/18* (2006.01)
(52) U.S. Cl. .................................................. 706/12
(58) Field of Classification Search .................. 706/12
See application file for complete search history.

(56) References Cited

U.S. PATENT DOCUMENTS

| | | | |
|---|---|---|---|
| 5,506,933 | A | 4/1996 | Nitta |
| 5,579,436 | A | 11/1996 | Chou et al. |
| 5,778,341 | A | 7/1998 | Zeljkovic |
| 6,009,390 | A | 12/1999 | Gupta et al. |
| 6,490,555 | B1 | 12/2002 | Yegnanarayanan et al. |
| 7,062,524 | B2 | 6/2006 | Walster et al. |
| 7,254,538 | B1 | 8/2007 | Hermansky et al. |
| 2004/0267530 | A1 | 12/2004 | He et al. |
| 2005/0065793 | A1 | 3/2005 | Choi et al. |
| 2006/0074656 | A1 | 4/2006 | Mathias et al. |
| 2007/0083373 | A1 | 4/2007 | Liu et al. |

OTHER PUBLICATIONS

"Minimum Divergence Based Discriminative Training", Jun Du, Peng Liu, Frank K. Soong, Jian-Lai Zhou, Ren-Hua Wang, INTERSPPECH, ICSLP Ninth International Conference on Spoken Language Processing, Sep. 17-21, 2006, pp. 2410-2413.*
"Modeling duration in a hidden Markov model with the exponential family", Mitchell, C. D., Jamieson, L. H., Acoustics, Speech, and Signal Processing, 1993 ICASSP-93, IEEE International Conference on Apr. 27-30, 1993, vol. 2, pp. 331-334.*
"Trust-Region Methods for Real-Time Tracking", Hwann-Tzong Chen, Tyng-Luh Liu, IEEE 8$^{th}$ International Conference on Computer Vision, Jul. 2001, vol. 2, pp. 717-722.*
"A New Kullback-Leibler VAD for Speech Recognition in Noise", Javier Ramirez, IEEE Signal Processing Letters, vol. 11, No. 2, Feb. 2004, pp. 266-269.*
Doumpiotis, "Lattice Segmentation and Minimum Bayes Risk Discriminative Training for Large Vocabulary Continuous Speech Recognition", at <<http://mi.eng.cam.ac.uk/~wjb31/ppubs/lseg-mbrdt.sub.pdf>>, Jul. 20, 2005, pp. 29.
Liu, et al., "A Constrained Line Search Optimization for Discriminative Training in Speech Recognition", <<at http:// ieeexplore.ieee.org/iel5/4216989/4218011/04218104.pdf?isNumber=>>, IEEE, 2007, pp. 329-332.
Sha, et al., "Large Margin Hidden Markov Models for Automatic Speech Recognition", available at least as early as Aug. 13, 2007, at <<http://www.cs.berkeley.edu/~feisha/pubs/nips2006.pdf>>, pp. 8.
Vertanen, "An Overview of Discriminative Training for Speech Recognition", available at least as early as Aug. 13, 2007, at <<http://www.inference.phy.cam.ac.uk/kv227/papers/Discriminative_Training.pdf>>, pp. 14.

* cited by examiner

*Primary Examiner* — Jeffrey A Gaffin
*Assistant Examiner* — Mai T Tran
(74) *Attorney, Agent, or Firm* — Lee & Hayes, PLLC

(57) ABSTRACT

An exemplary method for optimizing a continuous density hidden Markov model (CDHMM) includes imposing a constraint for discriminative training, approximating an objective function as a smooth function of CDHMM parameters and performing a constrained line search on the smoothed function to optimize values of the CDHMM parameters. Various other methods, devices and systems are disclosed.

20 Claims, 16 Drawing Sheets

TABLE 500
OBJECTIVE FUNCTIONS FOR VARIOUS DISCRIMINATIVE TRAINING CRITERIA ( $\delta(\cdot)$ : Kronecker delta function; $\alpha$ : Smoothing factor in MCE; $|\cdot|$ : Number of symbols in a string; LEV$(\cdot \| \cdot)$ : Levenshtine distance between two symbol strings; $D(\cdot \| \cdot)$ : Kullback-Leibler divergence )

| Criterion | Mapping function $f(z)$ | Alternative word sequences $\mathcal{M}_r$ | Gain function $G(W, W_r)$ |
|---|---|---|---|
| MMI | $z$ | All(recognized) | $\delta(W, W_r)$ |
| MCE | $\dfrac{1}{1+e^{(\alpha z + \beta)}}$ | All without $W_r$ | $\delta(W, W_r)$ |
| MWE | $e^z$ | All(recognized) | $|W_r| - \text{LEV}(W \| W_r)$ |
| MD | $e^z$ | All(recognized) | $-D(W \| W_r)$ |

FIG. 5

EXEMPLARY TECHNIQUE TO MAXIMIZE AN OBJECTIVE FUNCTION
600

CASE 1

○ INITIAL POINT
■ CRITICAL POINT
△ OPTIMAL POINT
— — - TRUST REGION
——— SEARCH DIRECTION
- - - - - GRADIENT DIRECTION

TABLE 1000

| case | direction $d$ | condition | $\hat{\epsilon}$ |
|---|---|---|---|
| 1 | | $\lambda^*$ is a maximum, $Q(d,\phi) \leq \rho^2$ | 1 |
| 2 | $\lambda^* - \lambda^0$ | $\lambda^*$ is a maximum, $Q(d,\phi) > \rho^2$ | $+\rho \cdot Q^{-\frac{1}{2}}(d,\phi)$ |
| 3 | | $\lambda^*$ is a minimum | $-\rho \cdot Q^{-\frac{1}{2}}(d,\phi)$ |
| 4 | $\nabla \mathcal{F}(\lambda^0)$ | $\lambda^*$ doesn't exist or it is a saddle point | $+\rho \cdot Q^{-\frac{1}{2}}(d,\phi)$ |

FIG. 10

TABLE 1100

| case | condition |
|---|---|
| 1 | $\gamma_{ik} > 0,\ Q(\boldsymbol{\mu}_{ik}^* - \boldsymbol{\mu}_{ik}^0, \boldsymbol{\Sigma}_{ik}^0) < \rho_1^2$ |
| 2 | $\gamma_{ik} > 0,\ Q(\boldsymbol{\mu}_{ik}^* - \boldsymbol{\mu}_{ik}^0, \boldsymbol{\Sigma}_{ik}^0) \geq \rho_1^2$ |
| 3 | $\gamma_{ik} < 0$ |
| 4 | $\gamma_{ik} = 0$ |

FIG. 11

TABLE 1200

| case | condition |
|------|-----------|
| 1 | $\gamma_{ik} O_{ik}(x^2) > O_{ik}^2(x),\ \gamma_{ik} > 0,\ Q(\sigma_{ik}^* - \sigma_{ik}^0, I) < \rho_2^2$ |
| 2 | $\gamma_{ik} O_{ik}(x^2) > O_{ik}^2(x),\ \gamma_{ik} > 0,\ Q(\sigma_{ik}^* - \sigma_{ik}^0, I) \geq \rho_2^2$ |
| 3 | $\gamma_{ik} O_{ik}(x^2) > O_{ik}^2(x),\ \gamma_{ik} < 0$ |
| 4 | $\gamma_{ik} O_{ik}(x^2) \leq O_{ik}^2(x)$ |

FIG. 12

TABLE 1300

| Training set | | Acoustic features | # tied states | # kernels/state |
|---|---|---|---|---|
| TIDIGITS | | MFCC, 13 + Δ + ΔΔ | 114 | 6 |
| Switch-board | mini-train | PLP, 13 + Δ + ΔΔ | 1500 | 12 |
| | h5train00 | PLP, 13 + Δ + ΔΔ | 6000 | 16 |
| RM | | MFCC, 13 + Δ + ΔΔ | 1600 | 6 |

FIG. 13

TABLE 1400

| Criterion | Optimization | WER (in %) |
|---|---|---|
| ML | BW | 1.16 |
| MMI | EBW | 0.65 |
|  | CLS | 0.42 |
| MD | EBW | 0.44 |
|  | CLS | 0.40 |

FIG. 14

TABLE 1500

| Criterion | Optimization | WER (in %) |
|---|---|---|
| ML | BW | 4.08 |
| MMI | EBW | 3.62 |
| | CLS | 3.43 |
| MPE | EBW w/ I-smooting | 3.87 |
| | CLS | 3.39 |

FIG. 15

CONSTRAINED LINE SEARCH OPTIMIZATION FOR DISCRIMINATIVE TRAINING OF HMMS

BACKGROUND

In the past few decades, discriminative training (DT) has been a very active research topic in the field of automatic speech recognition (ASR). Many DT methods have been proposed to estimate Gaussian mixture continuous density hidden continuous density Markov models (CDHMMs) in a variety of speech recognition tasks, ranging from small vocabulary isolated word recognition to large vocabulary continuous speech recognition tasks. Generally speaking, DT of CDHMMs is a typical optimization problem that starts with formulation of an objective function according to certain estimation criterion. Some popular DT criteria widely used in speech recognition include maximum mutual information (MMI), minimum error estimation (MCE), minimum word or phone error (MWE or MPE), minimum divergence (MD), and so on. Once the objective function is formulated, an effective optimization method must be used to minimize or maximize the objective function with respect to its CDHMM parameters.

With respect to optimization, in speech recognition, several different methods have been used to optimize the derived objective function, including the GPD (generalized probabilistic descent) algorithm based on the first-order gradient descent method, and the approximate second-order Quickprop method, and the extended Baum-Welch (EBW) algorithm based on growth transformation and so on.

The GPD and Quickprop methods are mainly used for optimizing the MCE-derived objective function even though they are general optimization methods which can be used for any types of differentiable objective functions. On the other hand, the EBW method has been initially proposed to maximize a rational objective function and later extended to Gaussian mixture CDHMMs for the MMI and MPE (or MWE) objective functions. Recently, the EBW method has also been generalized to optimize the MCE objective function as well as the MD objective function.

The EBW method has been widely accepted for DT because it is relatively easy to be implemented on word graphs for large scale ASR tasks and it has been demonstrated that the EBW algorithm performs well in many tasks. Essentially, all of these optimization methods attempt to search for a nearby locally optimal point of the objective function from an initial point according to both a search direction and a step size. Normally, the search direction is locally computed based on the first-order derivative (such as gradient) and the step size must be empirically determined in practice. As the result, the performance of these optimization methods highly depends on the location of the initial point and the property of objective functions. If the derived objective function is highly nonlinear, jagged and non-convex in nature, it is extremely difficult to optimize it effectively with any simple optimization algorithm, which is one of the major difficulties of DT of HMMs for speech recognition.

As described herein, various exemplary techniques can be used to optimize CDHMM parameters for applications such as speech recognition or, more generally, pattern recognition.

SUMMARY

An exemplary method for optimizing a continuous density hidden Markov model (CDHMM) includes imposing a constraint for discriminative training, approximating an objective function as a smooth function of CDHMM parameters and performing a constrained line search on the smoothed function to optimize values of the CDHMM parameters. Various other methods, devices and systems are disclosed.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 5 is a table of criteria and associated functions.

FIG. 10 is a table that presents search directions for Cases 1, 2, 3 and 4.

FIG. 11 is a table that presents conditions for applying a CLS solution to "means" for Cases 1, 2, 3 and 4.

FIG. 12 is a table that presents conditions for applying a CLS solution to "variances" for Cases 1, 2, 3 and 4.

FIG. 13 is a table that presents trial setups for various recognition tasks for comparative trials.

FIG. 14 is a table that presents trial results for recognition performance.

FIG. 15 is a table that presents comparative trial results for recognition performed using an exemplary CLS optimization and other optimization techniques.

DETAILED DESCRIPTION

An exemplary optimization method is referred to as a constrained line search (CLS) for discriminative training (DT) of Gaussian mixture continuous density hidden Markov models (CDHMM).

Figure 1:
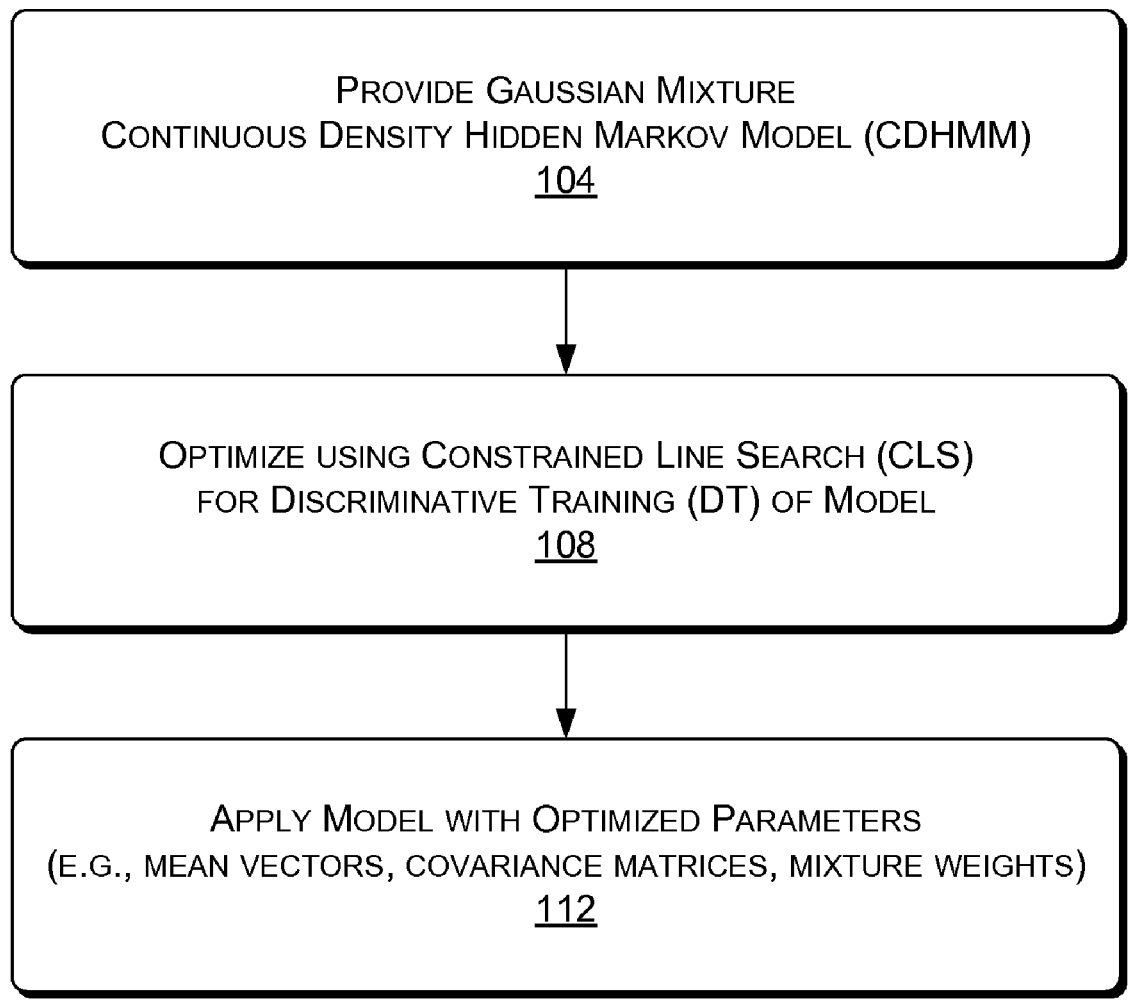
FIG. 1 is a block diagram of an exemplary method for optimizing a continuous density hidden Markov model (CDHMM).

FIG. 1 shows an exemplary method 100 that includes a provision block 104 for providing a Gaussian mixture CDHMM. An optimization block 108 optimizes parameters of the Gaussian mixture CDHMM using a constrained line search (CLS) for discriminative training (DT). An application block 112 applies the model with the optimized parameters, which may include mean vectors, covariance matrices and mixture weights.

Figure 2:
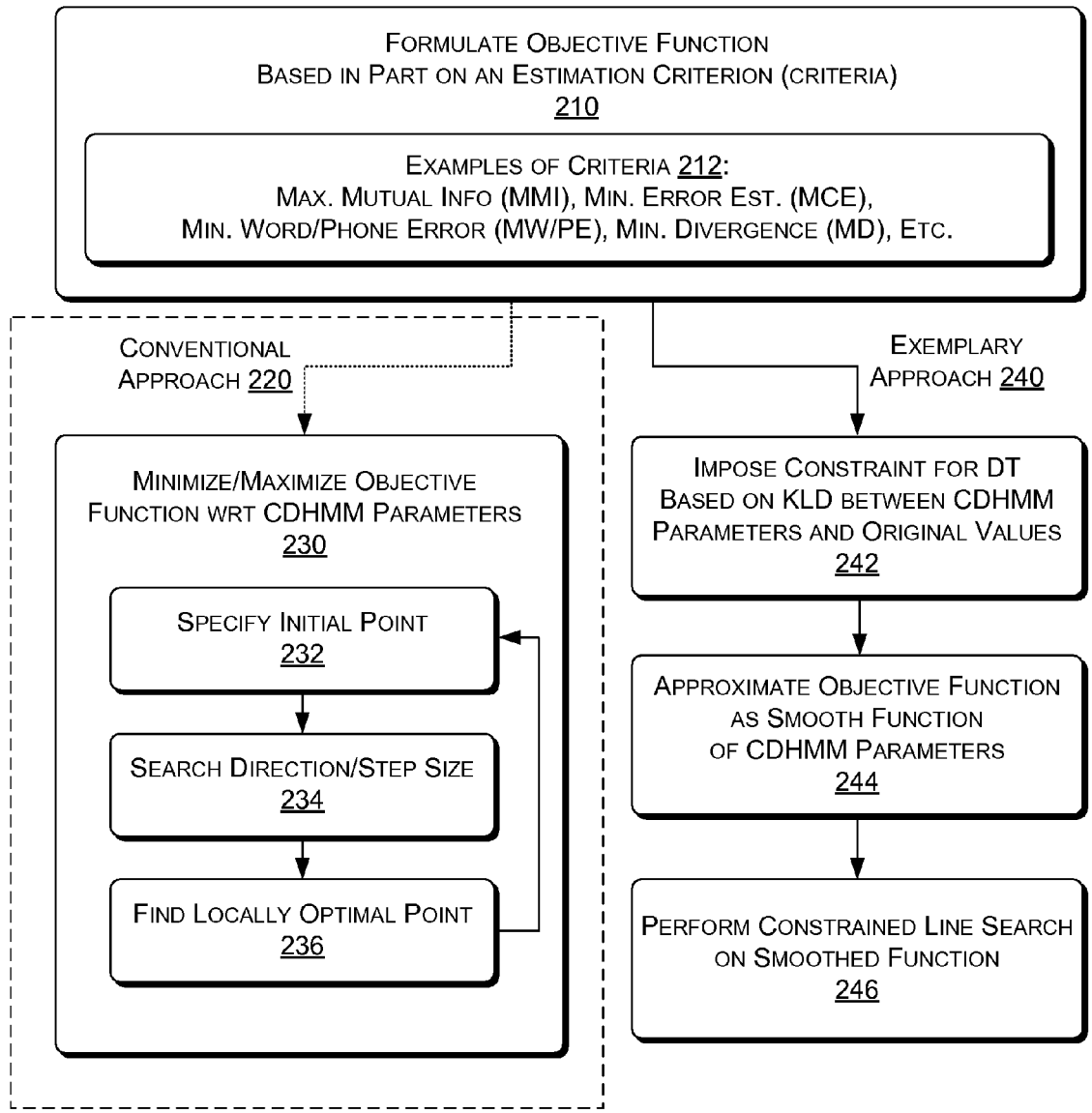
FIG. 2 is a block diagram of an exemplary method for optimizing a continuous density hidden Markov model (CDHMM) using objective function smoothing and a constrained line search.

FIG. 2 shows an exemplary method 200 that contrasts a conventional approach 220 with an exemplary approach 240. The method 200 commences in a formulation block 210 that formulates an objective function based in part on an estimation criterion or estimation criteria. Some examples of criteria 212 include maximum mutual information (MMI), minimum classification error (MCE), minimum phone/word error (MPE/MWE), and minimum divergence (MD).

In the conventional approach 220, an optimization block 230 minimizes or maximizes the formulated objective function with respect to a set of CDHMM parameters (see, e.g., Background section). In this approach, a specification block 232 specifies an initial point, an iteration block 234 determines a search direction and a step size to move away from the initial point and a location block 236 finds a locally optimal point.

In the exemplary approach 240, an imposition block 242 imposes a constraint for discriminative training (DT) based on Kullback-Leibler divergence (KLD) between models (e.g., parameter values for an initial model and parameter values for an updated model). The imposition block 242 essentially casts discriminative training (DT) of the CDHMM as a constrained maximization problem where the constraint guarantees that an equalized updating process occurs across all parameters in a model set. Next, an approximation block 244 approximates the objective function as a smooth function of CDHMM parameters. As described in more detail below, based upon reasonable approximations, closed-form solutions can be obtained for CDHMM parameters. To find a locally optimal point representative of CDHMM parameter values, a search block 246 performs a constrained line search (CLS) on the smoothed function of the CDHMM parameters. As explained below, given a line search and some approximation assumptions, manageable closed-form solutions can be derived for CDHMMs. The exemplary method 200 can be used to optimize all model parameters in Gaussian mixture CDHMMs, including mean vectors, covariance matrices, mixture weights.

Trial results are presented for several benchmark speech recognition tasks, including TIDIGITS, Resource Management (RM) and Switchboard. Results indicate that the exemplary training method significantly outperforms the popular, conventional EBW (extended Baum-Welch) method in all tasks in terms of recognition performance and convergence behavior.

As mentioned, an exemplary optimization method is referred to as a CLS for DT of Gaussian mixture CDHMMs. As a general optimization method, under a unified framework, such an exemplary CLS method is capable of optimizing most DT objective functions, which are derived from one or more popular DT criteria in speech recognition, such as MMI, MCE, MPE (or MWE) and so on. In a particular aspect, a manageable closed-form optimization formula can be derived to efficiently update all parameters of Gaussian mixture CDHMMs, including mean vectors, covariance matrices and mixture weights.

Figure 3:
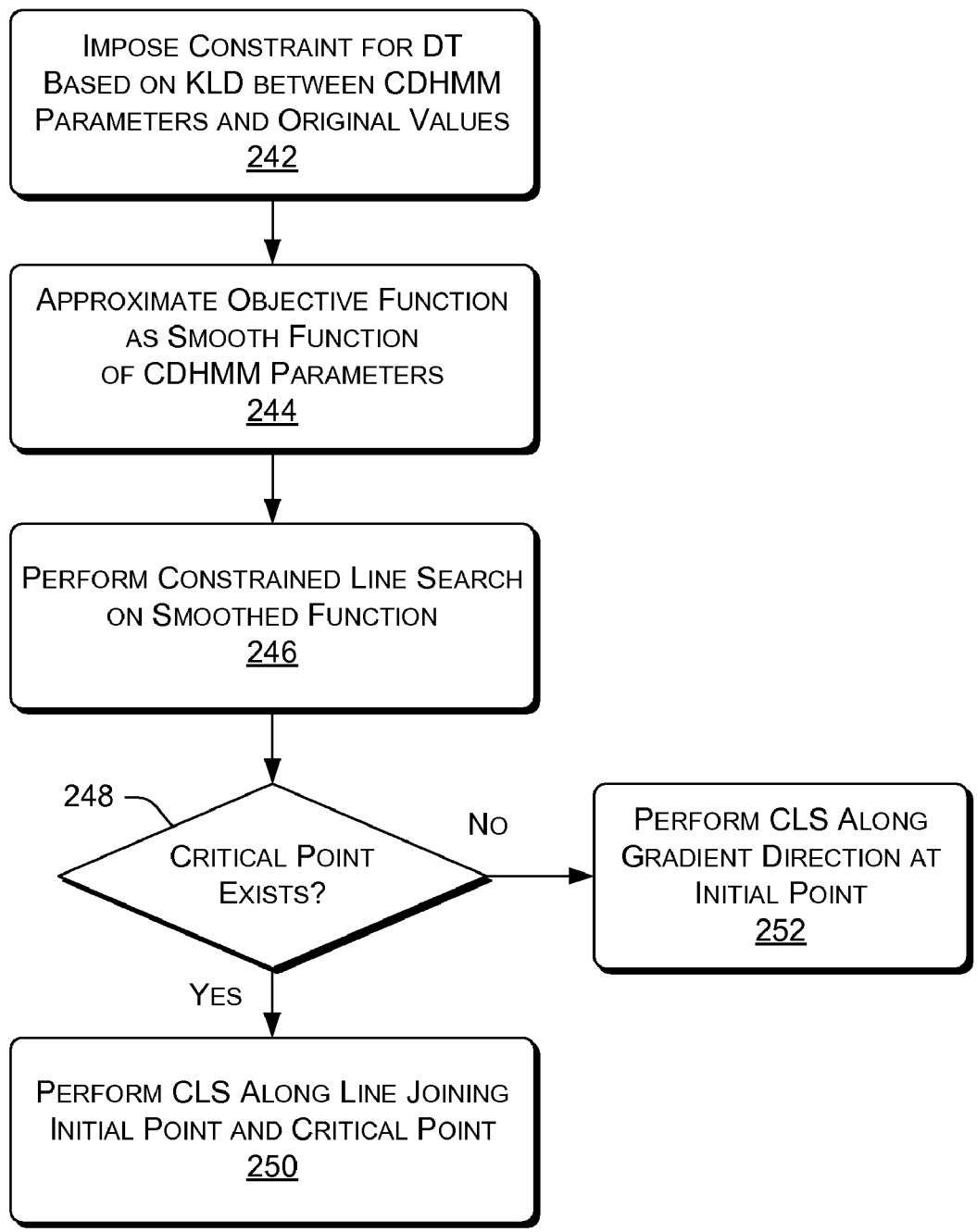
FIG. 3 is a block diagram of an exemplary method for optimizing a continuous density hidden Markov model (CDHMM) that includes deciding if a critical point exists.

FIG. 3 shows an exemplary method 300 that includes the steps 242, 244 and 246 of the exemplary approach 240 of FIG. 2. In addition, it includes a decision block 248 that decides if a critical point exists on the smoothed function. If a critical point exists, then the method 300 proceeds along a branch to a block 250 that performs a CLS along a line joining an initial point and the critical point. However, if the decision block 248 decides that a critical point does not exist, then the method 300 proceeds along a branch to a block 252 that performs a CLS along a gradient direction at the initial point.

In the method 300, the imposed constraint is based upon the nature that all the statistics are only reliable in a neighborhood of the original model. Under this constraint, the objective function can be approximated as a smooth function of CDHMM parameters and the sole critical point, if it exists, can be easily obtained by vanishing its derivative to zero. This is the role of the decision block 248 of the method 300, which is followed by a CLS to solve the constrained optimization problem.

As shown with respect to the blocks 250, 252, subject to the KLD constraint, the line search is performed either along the line joining the initial model and the critical point of the smoothed objective function if the critical point exists (the block 250) or along the gradient direction at the initial point if the critical point does not exist (the block 252).

Figure 4:
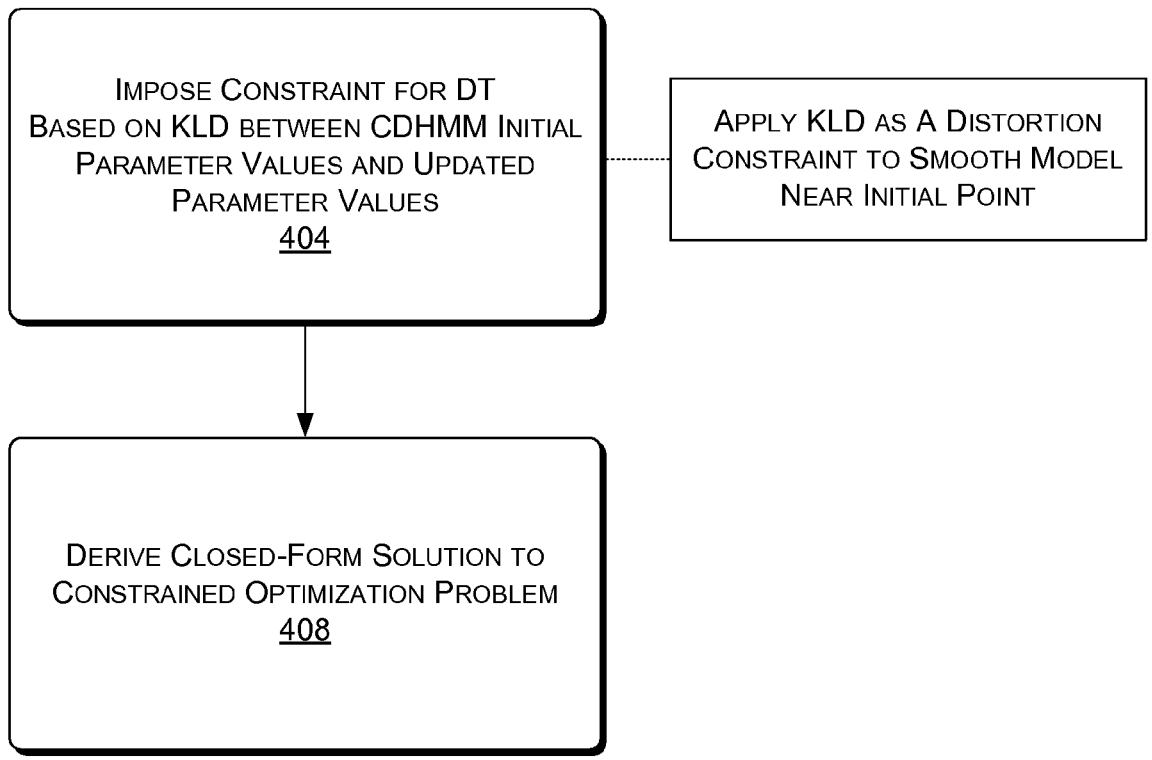
FIG. 4 is a block diagram of an exemplary method for imposing a constraint for discriminative training based on Kullback-Leibler divergence and obtaining a closed-form solution.

FIG. 4 shows an exemplary method 400 that includes deriving a closed-form solution to a constrained optimization problem. As explained, an imposition block 404 can impose a constraint for DT based on KLD between CDHMM initial parameter values and updated parameter values. In the method 400, KLD acts a distortion constraint to smooth a model near an initial point in CDHMM parameter space. With smoothing, a derivation block 408 can derive a closed-form solution to the constrained optimization problem.

According to the method 400, a closed-form solution can be derived to solve a KLD constrained optimization as long as formulation or approximation of the KLD constraint occurs in an appropriate way. Constrained optimization relies on the fact that statistics in DT only remain reliably when models stay close to their original points. Unlike in Maximum Likelihood (ML) training, it is hard to find an auxiliary function along with which the original objective is guaranteed to increase. Hence, the exemplary method 400 constrains distortion of models by KLD, which is a statistically sound distribution similarity measure.

Through use of a CLS, some degree of control is introduced for updating every model to be equalized and an entire training process can be more stable and effective.

As described with respect to the trials, an exemplary method has been used to optimize the MMI as well as other DT objectives in several speech recognition tasks, including the connected digit string recognition using TIDIGITS database, the resource management (RM) task, and a large vocabulary recognition in the Switchboard task. Results show that an exemplary line search method can significantly outperform the conventional EBW method in all evaluated ASR tasks in terms of final recognition performance and convergence behavior.

Various exemplary techniques are described in more detail below, generally, as follows: a technique to formulate the discriminative training as a KLD-based constrained optimization problem under a unified framework, a constrained line search technique to solve a constrained optimization problem for DT, application of techniques to CDHMMs, and various associated algorithms. Formulation of KLD Constraint DT criteria for a speech recognition model may assume that an acoustic model set $\Lambda$ is composed of many individual Gaussian mixture CDHMMs, each of which is represented as $\lambda=(\pi, A, B)$, where $\pi=\{\pi_1, \pi_2, \ldots \pi_N\}$ is the initial state distribution and N is the number of states in the HMM, $A = \{a_{ij}\}_{N \times N}$ is the transition matrix, and B is the state output distribution set, composed of Gaussian mixture distributions for all state i: $b_i(x)=\Sigma_{k=1}^{K} \omega_{ik} \cdot \aleph(x; \mu_{ik}, \Sigma_{ik})$, where $B_i=\{\omega_i, \mu_{ik}, \Sigma_{ik} | 1 \leq k \leq K\}$ with K standing for the number of Gaussian mixture components in each state, and $\aleph(x; \mu, \Sigma)$ represents a multivariate Gaussian distribution with mean vector $\mu$ and covariance matrix $\Sigma$.

For any training utterance X and its transcription W, consider how to compute an acoustic model score $p(X|W)$ based on the composite HMM $\lambda_W$ of W. Suppose $X=\{X_1, X_2, \ldots X_T\}$, let $s=\{s_1, s_2, \ldots s_T\}$ be any possible unobserved state sequence, and $l=\{l_1, l_2, \ldots l_T\}$ be the associated sequence of the unobserved mixture component labels. Thus, $p(X|W)$ is computed as Equation 1 (Eq. 1):

$$p(X \mid W) = \sum_{s} \sum_{l} \left\{ \pi_{s_1} \prod_{t=2}^{T} a_{s_{t-1} s_t} \cdot \prod_{t=1}^{T} \omega_{s_i l_t} \cdot \mathcal{N}\left(x_t; \mu_{s_i l_t}, \sum_{s_i l_t}\right) \right\}$$

where summations are taken over all possible state sequences s and mixture labels l.

Assume the whole training set consists of R different training utterances $X_1, X_2, \ldots, X_R$ along with their corresponding transcriptions, denoted as $W_1, W_2, \ldots, W_R$. For a unified view to represent various discriminative training criteria, the objective functions of CDHMMs derived from various discriminative training criteria can be formulated as the following form, as Equation 2 (Eq. 2):

$$\mathcal{F}(\Lambda) = p(\Lambda \mid \{X_r, W_r, \mathcal{M}_r\}_{r=1}^{R}, f, \kappa, G)$$
$$= \frac{1}{R} \sum_{r=1}^{R} f\left(\log\left[\frac{\sum_{E \in \mathcal{M}_r} p^{\kappa}(X_r \mid W_r) \cdot p(W_r) \cdot G(W, W_r)}{\sum_{W' \in \mathcal{M}_r} p^{\kappa}(X_r \mid W') \cdot p(W')}\right]^{1/\kappa}\right)$$

where $0 < \kappa \leq 1$ is the acoustic scaling factor, and $\mathcal{M}_r$ stands for all competing hypotheses of utterance $X_r$ which is compactly approximated by a word lattice generated from Viterbi decoding, and $f(\cdot)$ is a mapping function to transform the objective function, and $G(W, W_r)$ is the so-called gain function to measure the dissimilarity between the reference $W_r$ and a hypothesis W. Both the mapping function $f(\cdot)$ and the gain function $G(W, W_r)$ take different functional forms in various discriminative training criteria, as listed in Table 500 of FIG. 5. For purposes of an exemplary analysis described herein, it is assumed that language model score p(W) is fixed.

For constrained optimization for discriminative training, substitution of Eq. (1) into Eq. (2) yields a general DT objective function, F(Λ). In this example, the function is a highly complicated nonlinear function, which is extremely difficult to optimize directly. An exemplary approach to smooth this function can make the following assumptions: i) assume that all competing hypothesis spaces $\mathcal{M}_r$ remain unchanged during optimization; ii) use a sufficiently small scaling factor $\kappa$ ($\kappa \ll 1$) to smooth the original objective function, and then assume that all the state occupancies and Gaussian kernel occupancies remain unchanged. Under these assumptions, it becomes necessary to explicitly impose the constraint that the HMM model parameters Λ that do not significantly differ from their initial values to ensure that the above assumptions still remain valid during optimization since the initial models have been used to generate all word lattices $\{\mathcal{M}_r\}$ and to calculate likelihood function $p(X \mid \lambda_W)$ in Eq. (1) and to accumulate statistics from training data in optimization. This kind of constraint can be quantitatively defined based on Kullback-Leibler divergence (KLD) between models. An exemplary approach formulates a discriminative training problem of CDHMMs as a constrained maximization problem. In such an approach, the updating procedure can proceed iteratively, and in each iteration, given the initial model $\Lambda^0$, the optimization problem can be formulated as Equation 3 (Eq. 3):

$$\hat{\Lambda} = \underset{\Lambda}{\operatorname{argmax}} \mathcal{F}(\Lambda) \text{ subject to } \mathcal{D}(\Lambda \| \Lambda^0) \leq \rho^2,$$

where $D(\Lambda \| \Lambda^0)$ is KLD between Λ and its initial value $\Lambda^0$, and $\rho > 0$ is a pre-set constant to control the search range. The constraint in Eq. 3 intuitively specifies a trust region for optimization of the objective function.

Constrained Line Search

To solve the constrained optimization problem cast above, an exemplary approach uses a constrained line search (CLS) algorithm. The algorithm decomposes an optimization procedure into two steps. A first step involves determining an appropriate search direction to provide a direction to search for an optimal point. In a second step, searching occurs along the direction for an optimal linear inter/extrapolation factor which aims to maximize the objective function subject to the KLD constraint.

For purposes of explanation, any model parameter may be denoted λ and its corresponding initial value in a current iteration denoted $\lambda^0$. In the first step, the best search direction is selected. Assuming the objective function F(λ) is differentiable, the critical point $\lambda^*$, if it exists, can be obtained by vanishing $\nabla F(\lambda)$ to zero. Furthermore, if $\lambda^*$ is not a saddle point, it is reasonable to choose the line joining the critical point and the original point (i.e., $\lambda^*$ to $\lambda^0$) as the search direction. Otherwise, when the critical point is a saddle point or if the critical point does not exist, the following approach adopts the gradient $\nabla F(\lambda^0) \equiv \nabla F(\lambda)|_{\lambda = \lambda^0}$ as the search direction. The search direction $\mathcal{G}$ can be selected according to Equation 4 (Eq. 4):

$$d = \begin{cases} \lambda^* - \lambda^0, & \text{if } \lambda^* \text{ exists and is not a saddle point} \\ \nabla \mathcal{F}(\lambda^0), & \text{otherwise} \end{cases}$$

In the second step, the constrained optimization problem in Eq. 3 can be reformulated as Equation 5 (Eq. 5), a constrained search problem in a scalar space:

$$\hat{\epsilon} = \underset{\epsilon}{\operatorname{argmax}} \mathcal{F}[\lambda(\epsilon)] \text{ subject to } \mathcal{D}[\lambda(\epsilon) \| \lambda^0] \leq \rho^2,$$

where $\lambda(\epsilon) = \lambda^0 + \epsilon \cdot d$ is the new model parameters in the line search space accordingly to the factor $\epsilon$.

In general, such a constrained line search problem should be solved iteratively. However, according to an exemplary technique, if the constraint possesses the following quadratic form of Equation 6 (Eq. 6):

$$D(\lambda \| \lambda^0) = Q(\lambda - \lambda^0, \phi) \equiv (\lambda - \lambda^0)^T \phi^{-1} (\lambda - \lambda^0)$$

where φ is a positive-definite matrix, then the constrained line search problem can be solved directly. For conciseness of this explanation, $Q((\cdot, \cdot))$ is introduced to express a quadratic form.

In the instance a solution can be obtained by finding the crossing point of the line space $\lambda(\epsilon)$ and the boundary of the trust region, or equivalently, solving $D(\lambda^0 + \epsilon \cdot d \| \lambda^0) = \rho^2$ with respect to $\epsilon$. By substituting Eq. 6 into this Equation 7 (Eq. 7) results:

$$\epsilon^2 \cdot Q(d, \phi) = \rho^2$$

where roots can be represented as:

$$\epsilon = \pm \rho \cdot Q^{-\frac{1}{2}}(d, \phi)$$

An analysis of all the cases and boundary conditions provides a closed form solution for CLS with quadratic constraint. FIGS. 6, 7, 8 and 9 present graphics representing four cases (Case 1, 2, 3 and 4).

Figure 6:
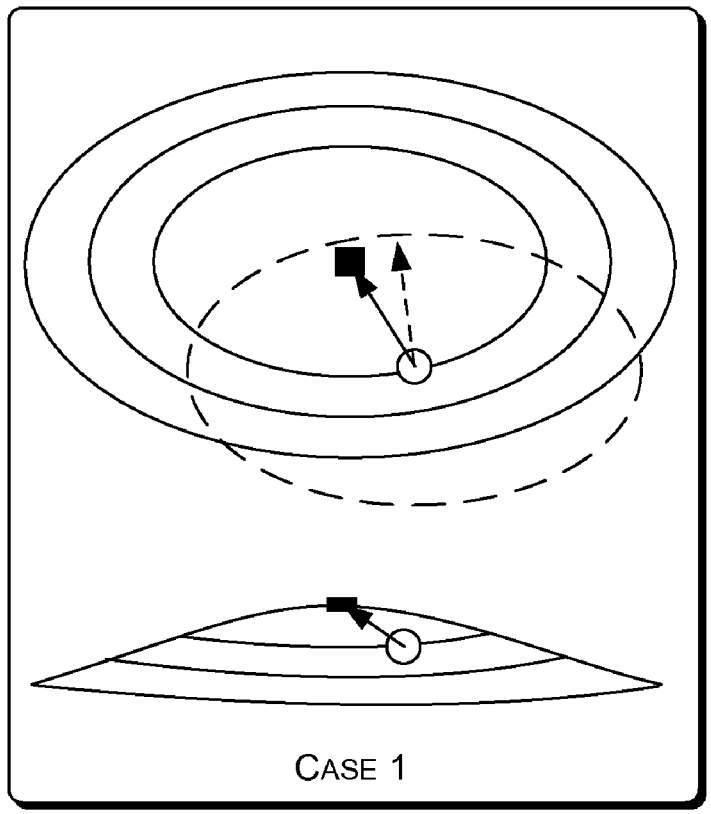
FIG. 6 is a graphic of an exemplary technique to optimize an objective function that corresponds to a case referred to as Case 1.

FIG. 6 shows an exemplary technique to maximize an objective function 600 that corresponds to Case 1. For Case 1, the critical point λ* exists, is a maximum and lies within a trust region. In Case 1, the model can be moved directly to the critical point λ*.

Figure 7:
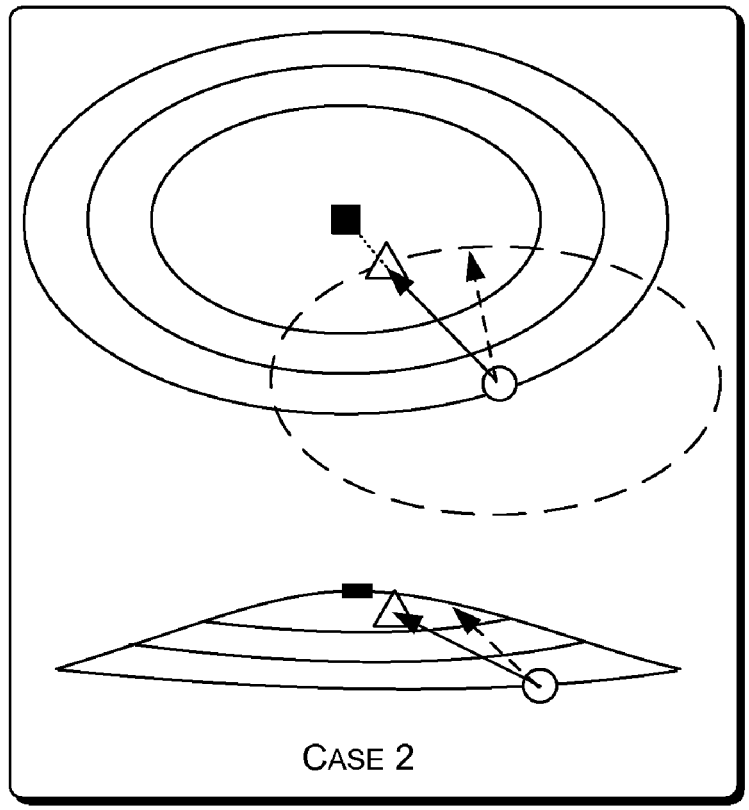
FIG. 7 is a graphic of an exemplary technique to optimize an objective function that corresponds to a case referred to as Case 2.

FIG. 7 shows an exemplary technique to maximize an objective function 700 that corresponds to Case 2. For Case 2, the critical point λ* exists and is a maximum but lies outside a trust region. In Case 2, the model can be moved to the positive root of Eq. 7.

Figure 8:
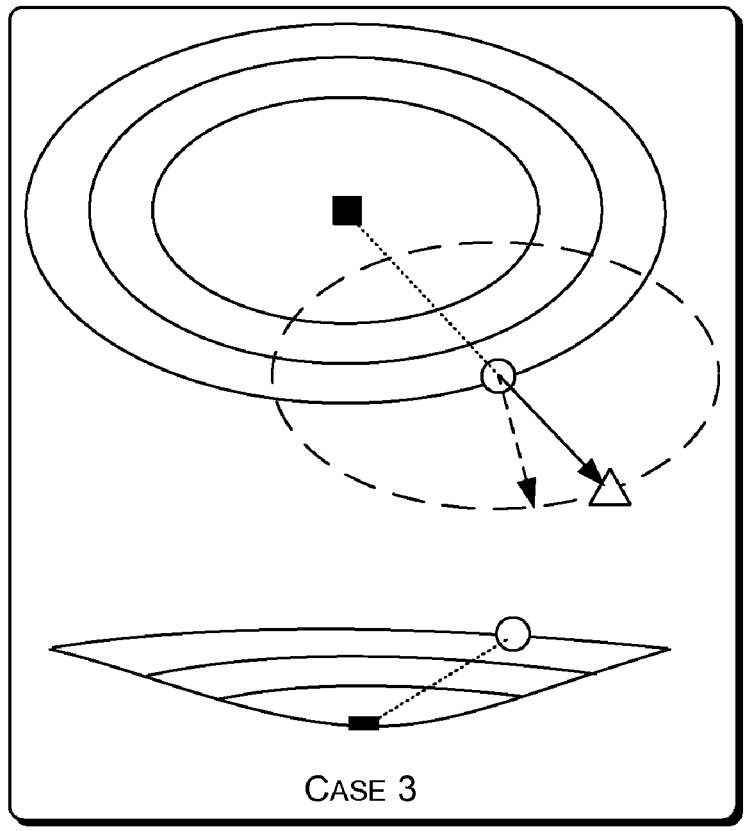
FIG. 8 is a graphic of an exemplary technique to optimize an objective function that corresponds to a case referred to as Case 3.

FIG. 8 shows an exemplary technique to maximize an objective function 800 that corresponds to Case 3. For Case 3, the critical point λ* exists but is a minimum that lies outside a trust region. In Case 3, the model can be moved to the negative root of Eq. 7.

Figure 9:
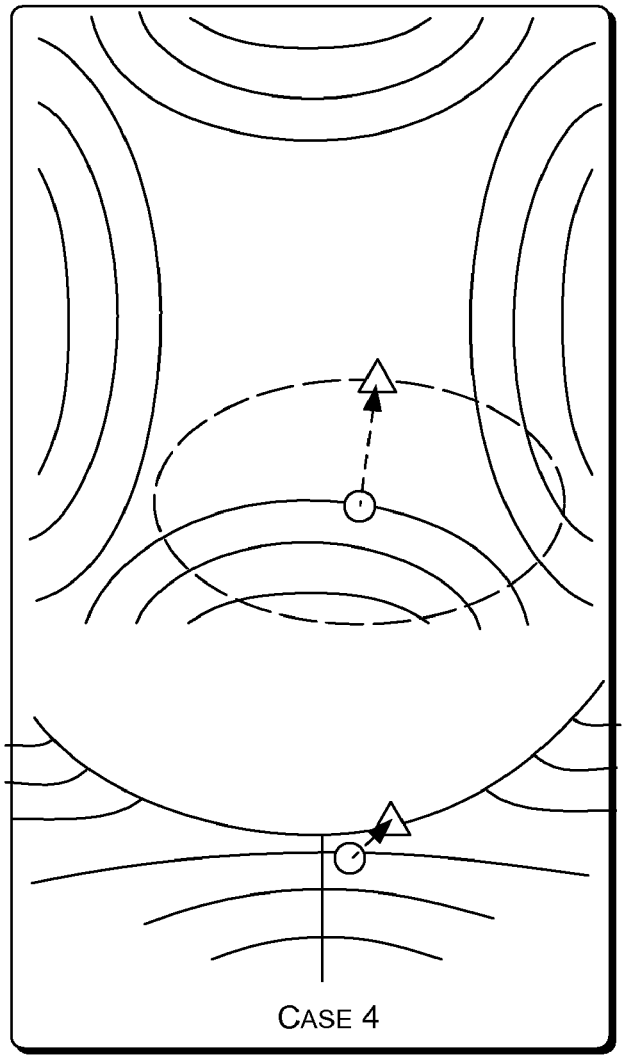
FIG. 9 is a graphic of an exemplary technique to optimize an objective function that corresponds to a case referred to as Case 4.

FIG. 9 shows an exemplary technique to maximize an objective function 900 that corresponds to Case 4. For Case 4, pertains to scenarios where the critical point λ* does not exist or where the critical point is a saddle point. In Case 4, the model can be moved to the positive root of Eq. 7.

FIG. 10 shows Table 1000, which lists solutions for Cases 1, 2, 3 and 4.

CLS for Gaussian Mixture CDHMM

A general solution for CLS with quadratic constraints has been explained. This exemplary approach can be applied to provide a solution to parameters of Gaussian Mixture CDHMMs. Such an approach solves two problems: First, how to decompose constraints to update mean, covariance and Gaussian weights separately, and then reasonably approximate the constraints by quadratic forms; and second, how to obtain the critical points and corresponding conditions, for example, as listed in Table 1000.

Constraint Decomposition for Gaussian Mixtures

It is reasonable to apply the KLD constraint to the Gaussian mixture model of each state. For the $i^{th}$ state, it can be written as: $D(b_i \| b_i^0) \leq \rho_2$. Furthermore, decomposition of the constraint for Gaussian weights, means and covariances can occur followed by updating them separately. By applying a log-sum inequality, an upper bound of the KLD between two Gaussian mixtures is obtained as Equation 8 (Eq. 8):

$$D(b_i \| b_i^0) \leq D(w_i \| w_i^0) + w_i^T e_i$$

where the transpose of vector $w_i$ denotes discrete distribution composed of all the Gaussian kernel weights in the $i^{th}$ state and where the vector $e_i$ includes $$e_{ik} = D(\aleph_{ik} \| \aleph_{ik}^0).$$

For KLD between two discrete distributions or two Gaussians, the Equation 9 (Eq. 9) represents closed-form solutions:

$$\mathcal{D}(\mathcal{N} \| \mathcal{N}^0) = \frac{1}{2} \left\{ Q(\mu - \mu^0, \Sigma^0) + tr[\Sigma(\Sigma^0)^{-1}] + \log \frac{|\Sigma^0|}{|\Sigma|} - D \right\}$$

$$\mathcal{D}(\omega \| \omega^0) = \omega^T (\log \omega - \log \omega^0)$$

where D is the dimensionality of the Gaussian. Accordingly, the KLD constraint can be decomposed to separate constraints for Gaussian means, covariances and weights as shown in Equation 10 (Eq. 10):

$$\begin{cases} Q(\mu_{ik} - \mu_{ik}^0, \Sigma_{ik}^0) \leq \rho_1^2 & (1 \leq k \leq K) \\ tr[\Sigma_{ik}(\Sigma_{ik}^0)^{-1}] + \log \frac{|\Sigma_{ik}^0|}{|\Sigma_{ik}|} - D \leq \rho_2^2 & (1 \leq k \leq K) \\ \omega_i^T (\log \omega_i - \log \omega_i^0) \leq \rho_3^2 \end{cases}$$

where $\rho_1^2$, $\rho_2^2$, $\rho_3^2$ are three pre-set constants to control ranges for weights, mean and covariance, respectively.

Quadratic Approximation of the Constraints

Based upon a basic assumption of CLS, the model parameters cannot run far away from their initial point. Given this assumption, the Taylor series approximation is applied to derive quadratic constraints for variances and weights. Consider an example that assumes a covariance matrix $\Sigma_{ik}$ that is diagonal. To guarantee the covariance is positive-definite, alternatively update the following vector logarithm domain: $\sigma_{ik} = (\log \sigma_{ik1}^2, \ldots, \log \sigma_{ikD}^2)^T$. Based upon the second-order Taylor series approximation $e^y - y - 1 \sim y^2/2$ and denoting $y_{ikd} = \log(\sigma_{ikd}/\sigma_{ikd}^0)^2$, provides Equation 11 (Eq. 11):

$$\mathcal{D}(\Sigma_{ik} \| \Sigma_{ik}^0) = tr[\Sigma_{ik}(\Sigma_{ik}^0)^{-1}] + \log \frac{|\Sigma_{ik}^0|}{|\Sigma_{ik}|} - D$$

$$= \sum_{d=1}^{D} (e^{y_{ikd}} - y_{ikd} - 1)$$

$$\approx \sum_{d=1}^{D} y_{ikd}^2 / 2$$

$$= \frac{1}{2} (\sigma_{ik} - \sigma_{ik}^0)^T (\sigma_{ik} - \sigma_{ik}^0)$$

Also, for Gaussian weights, one can adopt the Taylor series approximation $\log z \sim z - 1$ (when z is near to 1) and denote $Z_{ik} = w_{ik}/w_{ik}^0$. It is notable that for Gaussian weights, beside the KLD constraint, another constraint of $$\sum_{k=1}^{K} w_{ik} = 1.$$

Accordingly, Equation 12 (Eq. 12) can be obtained:

$$\mathcal{D}(\omega_i \| \tilde{\omega}_i) = \omega_i^T (\log \omega_i - \log \tilde{\omega}_i)$$

$$= \sum_{k=1}^{K} \omega_{ik} \log z_{ik}$$

$$\approx \sum_{k=1}^{K} \omega_{ik} (z_{ik} - 1)$$

$$= \sum_{k=1}^{K} \frac{\omega_{ik} \omega_{ik} - 2\omega_{ik}^0 \omega_{ik} + \omega_{ik}^0 \omega_{ik}}{\omega_{ik}^0}$$

$$= (\omega_i - \omega_i^0)^T (\Pi_i^0)^{-1} (\omega_i - \omega_i^0)$$

where $\{\Pi_i^0\}_{K \times K}$ is a diagonal matrix with $$\Pi_{i,kk}^0 = w_{ik}^0,$$

which is positive-definite. Equation 13 (Eq. 13) shows approximated quadratic constraints:

$$\begin{cases} Q(\mu_{ik} - \mu_{ik}^0, \Sigma_{ik}^0) \leq \rho_1^2 & (1 \leq k \leq K) \\ Q(\sigma_{ik} - \sigma_{ik}^0, I) \leq 2\rho_2^2 & (1 \leq k \leq K) \\ Q(\omega_i - \omega_i^0, \Pi_i^0) \leq \rho_3^2 \end{cases} \quad 5$$

Accordingly, all the constraints possess the form in Eq. 6, and general solutions can be applied directly for means, variances, and Gaussian weights.

Critical Points and Solutions

An exemplary technique determines a search direction for parameters of Gaussian mixture CDHMMs. According to this technique, critical points are derived based upon the general DT framework of Eq. 2, then concrete forms of the search directions for mean, variance and Gaussian weights are given.

According to the general assumptions in DT, the derivative of the objective function of Eq. 2 can be derived with respect to any model parameter and it can be represented as:

$$\nabla \mathcal{F}(\lambda) = \frac{\partial}{\partial \lambda} \mathcal{F}(\lambda) = \sum_i \sum_{k=1}^K O_{ik} \left( \frac{\partial}{\partial \lambda} \log(\omega_{ik} \cdot \mathcal{N}(x_{ri}; \mu_{ik}, \Sigma_{ik})) \right)$$

Concrete gradients and critical points of all the parameters in a Gaussian mixture CDHMM are given and then the aforementioned case conditions to facilitate applying the general CLS solution shown in Table 1000 are summarized. A general occupancy of each kernel is given as $\gamma_{ik} = O_{ik}(1)$.

For mean vectors:

$$\nabla \mathcal{F}(\mu_{ik}) = \Sigma_{ik}^{-1} \{O_{ik}(x) - \gamma_{ik} \mu_{ik}\}$$

The critical point is obtained by vanishing the equation to zero. Given a quadratic constraint, the general solution can be directly applied to mean vectors. Noting that the Laplacian operator of the objective function is semi-definite and the critical point cannot be a saddle point. Actually, the critical point is a maximum when the general occupancy is greater than zero and a minimum when the $O_{ik}(1) < 0$. To use the solutions presented in Table 1000 of FIG. 10, various case conditions are summarized in Table 1100 of FIG. 11.

For variances in a logarithm domain:

$$\nabla \mathcal{F}(\sigma_{ik}) = \frac{\Sigma_{ik}^{-1}}{2\gamma_{ik}} \{\gamma_{ik} O_{ik}(x^2) - O_{ik}^2(x) - \gamma_{ik}^2 \exp(\sigma_{ik})\}$$

By vanishing to zero, the following critical point can be found:

$$\sigma_{ik}^* = \log \frac{\gamma_{ik} O_{ik}(x^2) - O_{ik}^2(x)}{\gamma_{ik}^2}$$

Given the approximated quadratic constraint:

$$Q(\sigma_{ik} - \sigma_{ik}^0, I) \leq \rho_2^2$$

the general solution can also be applied to variances. Noting that the Laplacian of the objective function, whether $\sigma^*_{ik}$ is a minimum or maximum, is also determined by $\gamma_{ik}$. Table 1200 of FIG. 12 summarizes the case conditions for variances.

For Gaussian weights:

$$\nabla \mathcal{F}(\omega_i) = \Pi_i^{-1} (\gamma_{i1}, \gamma_{i2}, \ldots, \gamma_{iK})^T$$

To guarantee the updated mixture weights form a valid discrete probability distribution, an exemplary approach performs a constrained line search along a projected gradient direction. Hence, the gradient is projected into the hyperplane of $\Sigma_k w_{ik} = 1$, to satisfy the constraints of mixture weights. The projection can be represented as:

$$d(\omega_i) = \nabla \mathcal{F}(\omega_i^0) - \frac{1}{K} [\nabla \mathcal{F}(\omega_i^0) \cdot u] u$$

To obtain the solution, Case 4 of Table 1000 is followed along with use of the search direction given above.

Trial Results

To verify the effectiveness of an exemplary CLS optimization method, trials were performed on several benchmark speech recognition tasks, including connected digit string recognition using the TIDIGITS database, continuous speech recognition using the Resource Management (RM) database, and large vocabulary continuous speech recognition using the Switchboard (both the mini-train set and full h5train00 training set) database. Trial setups are summarized in Table 1300 of FIG. 13. In the trials, the trial exemplary CLS method was compared to a conventional EBW method for the criterion of MMI and other criteria with higher error resolution, such as MPE and MD. For all trials using EBW, kernel dependent smoothing factor was set to twice of the corresponding denominator occupancy. When applying EBW to MPE training, I-smoothing was used with a factor set to 100 in each iteration. Some of the trial recognition results are summarized in Table 1400 of FIG. 14. Additional results are summarized in Table 1500 of FIG. 15.

Exemplary Computing Device

Figure 16:
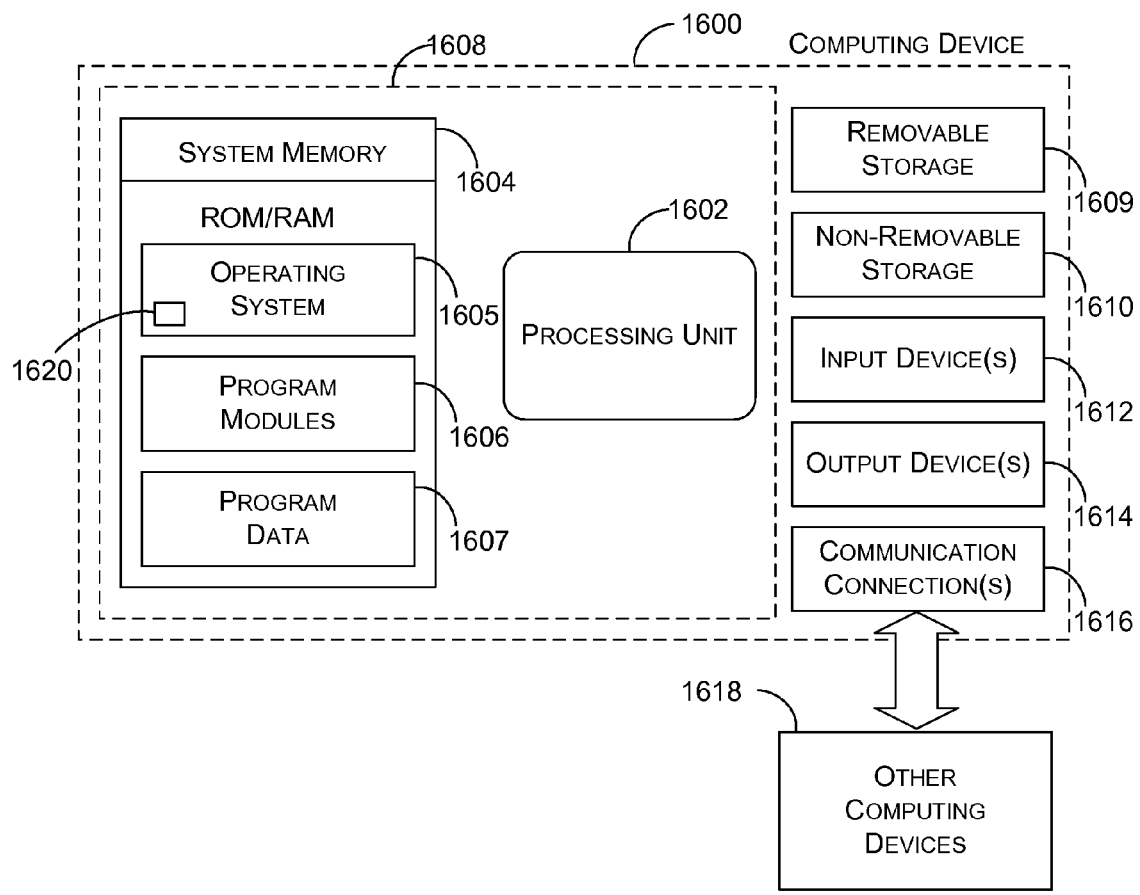
FIG. 16 is a diagram of various components of an exemplary computing device that may be used to implement part or all of various exemplary methods discussed herein.

FIG. 16 shows various components of an exemplary computing device 1600 that may be used to implement part or all of various exemplary methods discussed herein.

The computing device shown in FIG. 16 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 16, an exemplary system for implementing an exemplary optimization technique for speech recognition or other tasks that may rely on CDHMMs. In a very basic configuration, computing device 1600 typically includes at least one processing unit 1602 and system memory 1604. Depending on the exact configuration and type of computing device, system memory 1604 may be volatile (such as RAM), non-volatile (such as ROM, flash memory, etc.) or some combination of the two. System memory 1604 typically includes an operating system 1605, one or more program modules 1606, and may include program data 1607. This basic configuration is illustrated in FIG. 16 by those components within dashed line 1608.

The operating system 1605 may include a component-based framework 1620 that supports components (including properties and events), objects, inheritance, polymorphism, reflection, and provides an object-oriented component-based application programming interface (API), such as that of the .NET™ Framework manufactured by Microsoft Corporation, Redmond, Wash.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by removable storage 1609 and non-removable storage 1610. Computer storage media may include volatile and nonvolatile, removable and non-removable media implemented in any method or technology for storage of information, such as computer readable instructions, data structures, program modules, or other data. System memory 1604, removable storage 1609 and non-removable storage 1610 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1600. Any such computer storage media may be part of device 1600. Computing device 1600 may also have input device(s) 1612 such as keyboard, mouse, pen, voice input device, touch input device, etc. Output device(s) 1614 such as a display, speakers, printer, etc. may also be included. These devices are well know in the art and need not be discussed at length here.

Computing device 1600 may also contain communication connections 1616 that allow the device to communicate with other computing devices 1618, such as over a network. Communication connection(s) 1616 is one example of communication media. Communication media may typically be embodied by computer readable instructions, data structures, program modules, or other data storage structure. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

An exemplary computing device may include a processor, a user input mechanism (e.g., a mouse, a stylus, a scroll pad, etc.), a speaker, a display and control logic implemented at least in part by the processor to implement one or more of the various exemplary methods described herein for speech recognition. For speech recognition, such a device may be a cellular telephone or generally a handheld computer.

One skilled in the relevant art may recognize, however, that the techniques described herein may be practiced without one or more of the specific details, or with other methods, resources, materials, etc. In other instances, well known structures, resources, or operations have not been shown or described in detail merely to avoid obscuring aspects of various exemplary techniques. While various examples and applications have been illustrated and described, it is to be understood that the techniques are not limited to the precise configuration and resources described above. Various modifications, changes, and variations apparent to those skilled in the art may be made in the arrangement, operation, and details of the methods, systems, etc., disclosed herein without departing from their practical scope.

What is claimed is:

1. One or more computer-readable storage media comprising computer-executable instructions that, when executed by one or more processors, configure the one or more processors to perform acts comprising:
   imposing a constraint for discriminative training, the constraint limiting a difference between an initial continuous density hidden Markov model (CDHMM) parameter value and an updated CDHMM parameter value;
   approximating an objective function as a smooth function of CDHMM parameters; and
   performing a constrained line search on the smoothed function to optimize values of the CDHMM parameters.

2. The one or more computer-readable storage media of claim 1, wherein the CDHMM comprises a speech recognition CDHMM.

3. The one or more computer-readable storage media of claim 1, wherein the imposing comprising imposing a constraint based on Kullback-Leibler divergence (KLD).

4. The one or more computer-readable storage media of claim 3, wherein the KLD comprises a divergence between the initial CDHMM parameter value and the updated CDHMM parameter value.

5. The one or more computer-readable storage media of claim 1, wherein the smooth function comprises a function having a first derivative with respect to a CDHMM parameter.

6. The one or more computer-readable storage media of claim 1, wherein the performing a constrained line search comprises deciding if a critical point exists.

7. The one or more computer-readable storage media of claim 6, wherein, if a critical point exists, the performing comprises performing a constrained line search along a line joining an initial point and the critical point.

8. The one or more computer-readable storage media of claim 6, wherein, if a critical point does not exist, the performing comprises performing a constrained line search along a gradient direction at an initial point.

9. The one or more computer-readable storage media of claim 1, wherein the imposing a constraint comprises imposing a distortion constraint.

10. The one or more computer-readable storage media of claim 9,wherein the distortion constraint allows for approximating a smooth model in a region near an initial point.

11. The one or more computer-readable storage media of claim 9, wherein the approximating an objective function comprises approximating the objective function as a quadratic function.

12. The one or more computer-readable storage media of claim 11, wherein the quadratic function comprises roots.

13. The one or more computer-readable storage media of claim 1, wherein the performing comprises selecting a trust region.

14. The one or more computer-readable storage media of claim 13, wherein the trust region acts to ensure accuracy of a quadratic solution to the smooth function.

15. The one or more computer-readable storage media of claim 13, wherein the selection of a positive or a negative root depends on whether a critical point exists in a selected trust region.

16. The one or more computer-readable storage media of claim 1, wherein the performing decides if a critical point does not exist or if a saddle point exists for the smooth function.

17. The one or more computer-readable storage media of claim 1, wherein the CDHMM comprises a CDHMM for pattern recognition.

18. One or more computer-readable storage media comprising computer-executable instructions that, when executed by one or more processors, configure the one or more processors to perform acts comprising:
  imposing a constraint for discriminative training based on Kullback-Leibler divergence between an initial continuous density hidden Markov model (CDHMM) parameter value and an updated CDHMM parameter value;
  approximating an objective function as a smooth function of CDHMM parameters; and
  performing a constrained line search on the smoothed function to optimize values for the CDHMM parameters.

19. The one or more computer-readable storage media of claim 18, further comprising providing data and recognizing speech using optimized values.

20. A computing device comprising:
  a processor;
  memory coupled to the processor; and
  control logic, maintained on the memory and operable on the processor, to impose a constraint for discriminative training, the constraint limiting a difference between an initial continuous density hidden Markov model (CDHMM) parameter value and an updated CDHMM parameter value, to approximate an objective function as a smooth function of CDHMM parameters and to perform a constrained line search on the smoothed function to optimize values for the CDHMM parameters.

* * * * *